United States Patent Office

3,819,592
Patented June 25, 1974

3,819,592
MOLECULAR WEIGHT REGULATION OF ETHYL-
ENE-ALPHA-OLEFIN COPOLYMERS
Harry Dale Visser, Cheshire, and Walter Nudenberg,
Newtown, Conn., assignors to Uniroyal, Inc., New
York, N.Y.
No Drawing. Filed Aug. 27, 1973, Ser. No. 391,902
Int. Cl. C08f 1/56, 1/34, 1/80
U.S. Cl. 260—80.78      42 Claims

ABSTRACT OF THE DISCLOSURE

In the copolymerization of alpha-olefins, especially the copolymerization of ethylene and propylene (with a diene if desired), using a coordination type catalyst based on a vanadium salt and an alkylaluminum halide, the molecular weight of the polymer can be regulated, and, in some cases, the activity of the catalyst can be enhanced, by adding certain dithiocarbamates, phosphorodithioates or dithiocarbonates. Elastomers having improved processability can be made in this way, as well as elastomers which are liquids at ambient temperatures and which are useful as adhesives, sealants, etc.

---

This invention relates to the preparation of ethylene-alpha-olefin copolymer rubbers, especially ethylene-propylene copolymers, and more particularly it relates to the regulation of the molecular weight of such rubbers.

Synthetic, rubbery ethylene-alpha-olefin copolymers are important and valuable materials, especially the unsaturated, sulfur-vulcanizable forms of such copolymers containing copolymerized therein a non-conjugated diene in addition to the ethylene and alpha-olefin. The invention is concerned with an improvement in a highly preferred method of making such copolymers, using a soluble catalyst based on an alkylaluminum halide and a vanadium salt.

While such a catalyst system has many advantages, nevertheless it has been desirable to improve still further the polymerization method. In particular, it has been desirable to provide a way of regulating the molecular weight of the polymer, so that a material of lower molecular weight and easy processability can be obtained. In anionic coordination polymerization, the molecular weight of the polymer produced is usually high, frequently too high even for conventional applications as a rubber, e.g. too high molecular weight for good mill processability). The molecular weight can usually be varied to some degree by changing polymerization parameters, such as catalyst and cocatalyst type, catalyst concentration, concentration of monomers and polymerization temperature. The magnitude of the molecular weight reduction obtained from these changes is usually rather small, and in addition the yield and quality of the product is often adversely affected. Another way of reducing the molecular weight involves the use of a so-called molecular weight regulator which, when added to the polymerization, reduces the molecular weight, hopefully without having any adverse effect on the quantity or quality of the polymer product. There are basically two factors which govern the degree of molecular weight regulation attainable from a given molecular weight regulator. The first factor is the regulator type. Some regulators, by virtue of their mode of operation, are simply more effective than other regulator types. The second factor is the concentration at which the regulator can be used. Some regulators tend to shortstop the polymerization when used at high levels, while other, like hydrogen, can be used at extremely high levels without any adverse effect on the polymerization. This latter fact enables one to obtain a high degree of regulation from hydrogen. Liquid ethylene-propylene copolymers can be made using this type of approach as described in Netherlands Pat. 6803332, Sun Oil Co., Mar. 8, 1967. A similar system was also used to make the so-called "near liquid," low molecular weight ethylene-propylene-dicyclopentadiene copolymers. This invention provides novel, unusually powerful regulators, and makes possible the production of truly liquid copolymers, including both terpolymers and binary copolymers.

The regulators of this invention can be used by themselves or may be used in combination with a second regulator such as hydrogen. With certain catalyst systems this modifier/hydrogen combination is particularly effective as a regulator. The bulk of the molecular weight regulation obtained from this type of combination results from the regulator and not from the hydrogen but the hydrogen can be used to achieve further regulation or reduction of molecular weight and also, in some cases, improvement of catalyst efficiency.

Organometallic compounds such as diethylzinc or diethylcadmium have been disclosed as regulators (British Pat. 889,852, Montecatini, July 26, 1960 and British Pat. 902,845, Shell Research, Ltd., June 2, 1960). These compounds are, however, expensive, and difficult to handle due to their pyrophoric nature. These difficulties can be overcome by the use of metal complexes such as cobalt (III) acetylacetonate (U.S. Pat. 3,462,399, D. N. Matthews, Aug. 19, 1969) or zinc acetylacetonate (Canadian Pat. 864,629, B. F. Goodrich, Aug. 2, 1968). The metal complexes employed in this invention differ from those mentioned above in that they are sulfur-based rather than oxygen-based metal complexes and are commonly known to those in the art as sulfur vulcanization accelerators. Certain organic and inorganic sulfur compounds have been demonstrated to possess molecular weight regulating ability; in fact, sulfur itself is an activator/regulator (U.S. Pat. 3,377,325, F. C. Loveless, Apr. 9, 1968). Alkyl disulfides are also regulators (U.S. Pat. 3,462,399, D. N. Matthews, Aug. 19, 1969).

According to the present invention, it has been found that certain sulfur vulcanization accelerators are capable of regulating the copolymerization of ethylene and another alpha-olefin, with or without a copolymerizable polyene, by the conventional soluble catalyst system based on an alkylaluminum halide and a vanadium salt. More particularly, the invention is based on the discovery that certain (a) phosphorodithioates, (b) dithiocarbamates, and (c) dithiocarbonates are effective regulators of the copolymerization.

It is to be emphasized that the catalyst system employed in the invention is of the soluble kind (i.e., soluble in the monomers and/or in the usual solvents used as polymerization media, e.g., hexane), as distinguished from insoluble or heterogeneous catalyst systems. The alkylaluminum halide that forms the catalyst system along with the vanadium salt may be a dialkylaluminum halide, a monoalkylaluminum dihalide or an alkylaluminum sesquihalide, where the alkyl group can have from 1 to 10 carbon atoms, such as a methyl, ethyl, propyl, etc. The halogen in these alkylaluminum compounds is usually chlorine, although bromine or other halogen may be used. Among the vanadium salts which may be used are vanadium halides, oxyhalides, alkoxides and acetylacetonates. Specific examples of these compounds are vanadium trichloride, vanadium tetrachloride or bromide, vanadium oxydichloride, vanadium oxytrichloride, trialkyl vanadates (especially where the alkyl group contains 1–12 carbon atoms, e.g. tri-*n*-butyl vanadate), vanadyl or vanadium acetylacetonate, and the like, as well as compounds based on mixtures of more than one of the foregoing types, such as dialkyl halovanadates (e.g. dibutyl chlorovanadate) and alkyl dihalovanadates (e.g. butyl dichlorovanadate). In many cases the preferred vanadium salts are vanadium oxytrichloride, vanadyl or vanadium acetylacetonates, lower trialkyl vanadates (where the alkyl groups contain 1–4 carbon atoms) and halovanadates, especially chlorovanadates(mono and dichloro). As in conventional practice, the molar ratio of aluminum to vanadium is ordinarily at least 4:1 and usually about 10:1; higher ratios such as 20:1, 35:1, or even higher, may be used. If desired, very high ratios of aluminum to vanadium (e.g. 200:1 or higher) may be employed, especially in those cases where the concentration of the vanadium salt is very small. Conventional catalysts of this kind are described in U.S. Pat. 3,547,855, Loveless, Dec. 15, 1970.

The sulfur vulcanization accelerators which can be used as regulators in the present invention may be (a) a phosphorodithioate of the following formula:

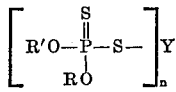

(b) a dithiocarbamate of the formula

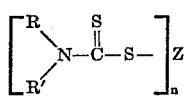

or (c) a dithiocarbonate of the formula

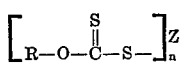

Considering first the phosphorodithioates (a), R and R' in the stated formula can be the same or different and can be, for example, an alkyl group (such as methyl, ethyl, butyl, hexyl, octyl, dodecyl or octadecyl), a cycloalkyl group (such as cyclopentyl, cyclohexyl or cyclooctyl), an aryl group (such as phenyl, tolyl, xylyl, nonylphenyl, naphthyl), an aralkyl group (such as benzyl, phenylethyl, phenylbutyl or naphthylethyl), or the like. The R and R' need not be separate distinct organic groups but can also constitute a diradical, such as trimethylene, 2,2-dimethyltrimethylene, tetramethylene, or pentamethylene. Y may be a metal atom from Groups I–B (copper, silver, gold), II–B (zinc, cadmium, mercury), III–B (scandium, yttrium) IV–B (titanium, zirconium, hafnium, V–B (vanadium, niobium, tantalum), VI–B (chromium, molybdenum, tungsten), VII–B (manganese, technetium, rhenium), VIII–B (iron, cobalt, nickel), III–A (aluminum, gallium, indium, thallium) and IV–A (germanium, tin, lead) in the Periodic Chart, while $n$ of course depends upon the valence state of the particular metal atom in question. In the case of these phosphorodithioates Y can also be hydrogen, as in O,O-diethyl hydrogen phosphorodithioate, O,O-diisopropyl hydrogen phosphorodithioate, and O,O-2,2-dimethyltrimethylene hydrogen phosphorodithioate. Some examples of metal phosphorodithioates are zinc O,O-diethyl phosphorodithioate, zinc O,O-dipentyl phosphorodithioate, chromium (III) O,O-diethyl phosphorodithioate, nickel (II) O,O-diethyl phosphorodithioate, cobalt (III) O,O-diethyl phosphorodithioate, copper (II) O,O-diethyl phosphorodithioate, zinc O,O-dineopentyl phosphorodithioate, zinc O,O-dicyclopentyl phosphorodithioate, zinc O,O-dicyclohexyl phosphorodithioate, zinc O,O-dibenzyl phosphorodithioate, and zinc O,O-diphenethyl phosphorodithioate.

The preferred type (a) regulators are the zinc salts; however, the zinc salt need not be added to the reactor as a distinct entity, but can be prepared in situ by reacting a non-regulating zinc salt such as zinc stearate or a zinc halide with an O,O-disubstituted hydrogen phosphorodithioate such as O,O-diethyl hydrogen phosphorodithioate.

Regarding the dithiocarbamate regulators of formula (b), R, R' and $n$ in this type may be as previously defined for the phosphorodithioates (a), and Z may be a metal atom as defined in case (a). Some typical examples of type (b) are zinc N,N-dimethyl dithiocarbamate, zinc N,N-dibutyl dithiocarbamate, zinc N-n-octadecyl-N-isopropyl dithiocarbamate, iron (III) N-n-octadecyl-N-isopropyl dithiocarbamate, copper (II) N-n-octadecyl-N-isopropyl dithiocarbamate, chromium (III) N-n-octadecyl-N-isopropyl dithiocarbamate, nickel (II) N-n-octadecyl-N-isopropyl dithiocarbamate, nickel (II) N,N-dibutyl dithiocarbamate, zinc N,N-pentamethylene dithiocarbamate, zinc N-ethyl-N-phenyl dithiocarbamate, and zinc N,N-dibenzyl dithiocarbamate.

Some of these metal dithiocarbamates with short chain alkyl groups tend to be not as soluble as would be desirable in non-polar hydrocarbon solvents, such as hexane or benzene. The solubility of these dithiocarbamates can be substantially increased by the use of a complexing agent such as pyridine, benzylamine, or n-butylamine as reported by G. M. C. Higgins and B. Saville, J. Chem. Soc. 2817 (1963). These 1/1 complexes are at least equivalent to the uncomplexed parent dithiocarbamate compound in terms of regulating ability.

The preferred type (b) regulators are the zinc dithiocarbamates where the R and R' are alkyl groups with 4–10 carbon atoms.

In type (c), the dithiocarbonate type, R, Z, and $n$ may be as defined previously. Some typical dithiocarbonates are zinc O-butyl dithiocarbonate, zinc O-ethyl dithiocarbonate, zinc O-cyclohexyl dithiocarbonate, chromium (III) O-ethyl dithiocarbonate, and nickel (II) O-ethyl dithiocarbonate.

Depending upon the exact structure of the regulator and the degree of molecular weight regulation desired, these regulators are frequently used at a level of 0.05 to 5 times of the vanadium catalyst (on a molar basis). The preferred level usually lies between 0.5 to 1.5 times the molar concentration of the vanadium catalyst species.

Some of the regulators employed in this invention such as O,O-2,2-dimethyltrimethylene hydrogen phosphorodithioate, are catalyst activators (i.e. they increase the catalyst efficiency) while others such as zinc O,O-bis-4-methyl-2-pentyl)phosphorodithioate or zinc N,N-dibutyldithiocarbamate, can function as activators under certain specific polymerization conditions, particularly polymerizations where very low catalyst levels are used. In addition to being regulators and activators, the regulators of this invention can, when used in conjunction with other regulators such as hydrogen or by an appropriate choice of alkyl aluminum halide cocatalyst, give either a very narrow or a very broad molecular weight distribution (in other words, give molecular weight distributions broader or narrower than that obtained in the absence of any regulator).

One other factor that affects the processability of terpolymers is the extent of long chain branching. When a polycyclic diene is used as the termonomer there is an undesirable tendency for long chain branches to form during the polymerization, with the result that the elastomers are difficult to process. The poor processing of conventional cyclic diene types of EPDM (ethylene-propylene-non-conjugated diene terpolymer rubber) is manifested in excessively long milling times required to form a continuous band on a rubber mill, poor extrusion characteristics, and the like.

The improvement in processability (linearity) brought about by the presence of some of these vulcanization accelerators from the start of the terpolymerization in accordance with the invention is manifested in significantly reduced milling time required to form a continuous band of the terpolymer rubber on a mill, with consequent economy, efficiency and ease of compounding and shaping. The increased linearity (decreased long chain branching) of the product of the present process may be expressed as a number termed the "branching index," which may in turn be calculated from measured values of the zero shear viscosity (see Tokita et al., Rubber Chemistry and Technology, Vol. 42, No. 2, June, 1969, p. 944) and the intrinsic viscosity. The branching index, "B.I.," is given by the expression B.I.=long 10 ($\eta_0$) —4.39 long$_{10}$ (I.V.) —5.06 where $\eta_0$ is the zero shear viscosity (expressed as poises, measured at 130° C.) and I.V. is the intrinsic viscosity (expressed as deciliters per gram, measured in Tetralin at 135° C.).

Ethylene-propylene copolymers prepared by methods described herein are of particular interest as lubricating oil additives, especially as viscosity index improvers. Liquid or pseudo liquid terpolymers can be made using these molecular weight regulators of combinations of these molecular weight regulators and other conventional regulators such as hydrogen. These materials can be utilized as adhesives, sealants, caulking compounds or tackifiers.

In general the liquid elastomers cover a broad range of bulk viscosities. A liquid elastomer is often defined as one which can be pumped or poured at a reasonable temperature. In terms of measurable quantities this is usually taken to mean an elastomer with a Brookfield viscosity of 1500 poises or less at temperatures from room temperature (e.g., 25° C.) up to 100° C. The synthetic methods described in this invention are sufficiently versatile so that they can make liquid ethylene-propylene copolymers (whether saturated binary copolymers or unsaturated terpolymers) of various viscosities in the 25 to 100° C. range.

One of the advantages of liquid elastomers (low molecular weight copolymers) is that the curatives can easily be dispersed into the compounded formulation by hand mixing or by some other simple mechanical mixing equipment. This advantage is most significant in cases where the curing system is operative at ambient temperature or some modest temperature above room temperature. Examples of such cure systems are the following: (a) quinone dioxime/PbO$_2$; (b) halomethyl phenolic/ZnO; (c) accelerated sulfur; (d) quinone dioxime/N-haloamide (copending application Ser. No. 225,641, S.I. Cantor, filed Feb. 11, 1972); and (e) trihaloisocyanuric acid (copending application Ser. No. 325,907, Perkins, filed Jan. 22, 1973). Curable liquid ethylene-alpha-olefin-diene terpolymers can be utilized as adhesives, caulking compounds, sealants and plasticizing coagulants. The liquid terpolymers and the ethylene-alpha-olefin binary copolymers can also be used as tackifiers, plasticizers, or lubricants where curing is not a necessary requirement.

It will be understood that the present invention is applicable to the production of copolymers of ethylene and at least one other alpha-olefin (e.g., propylene, 1-butene, 1-octene, etc.), of the formula CH$_2$=CHR where R is an alkyl group of 1 to 12 carbon atoms, with or without at least one copolymerizable polyene, especially a diene, particularly a non-conjugated diene, whether an open-chain diolefin such as 1,4-hexadiene or a cyclic diene such as dicyclopentadiene, bicyclononadiene, the alkylidene norbornenes (e.g., 5-methylene-2-norbornene, 5-ethylidene-2-norbornene, 5-propylidene - 2 - norbornene), etc. Preferred terpolymers contain from about 1 to about 25% (more preferably about 2 to about 25%) by weight of a non-conjugated diene such as dicyclopentadiene or the like; the remaining portion of the terpolymer contains propylene (or other alpha-olefin) and ethylene in the weight ratio in the range from about 15/85 to about 85/15. Ethylene-propylene binary copolymers have the same weight ratio of propylene and ethylene as the terpolymers.

The polymerization is conveniently carried out in a solvent, although an added solvent is not essential; the monomers being polymerized can serve as the solvent. In general, the normal solvents for coordination anionic polymerization can be used. These include the aromatic hydrocarbons (e.g. benzene, toluene or xylene), aliphatic hydrocarbons (e.g. hexane or heptane), chlorobenzene, tetrachloroethylene, and any other inert solvent which will not destroy the catalyst. The temperature is not critical and may be as in conventional practice, e.g., from 0° C. to 100° C.

The procedure may otherwise be the same as in conventional practice as far as such details as type of polymerization equipment, pressure, concentration of catalyst, ratio of catalyst to cocatalyst, and the like, are concerned and may be carried out batchwise or continuously (see for example U.S. Pat. 3,341,503, Paige et al., Sept. 12, 1967). Incremental addition of ingredients may be employed. In a continuous polymerization the organoaluminum compound, the regulator and the vanadium compound may be added as separate feeds to the monomer solution. In a batch polymerization a preferred procedure involves combining the organoaluminum compound and the regulator in the presence of at least a portion of the monomers and then adding the vanadium compound.

The following examples will serve to illustrate the practice of the invention in more detail.

Example 1

This example demonstrates the use of zinc O,O-bis(4-methyl-2-pentyl)phosphorodithioate as regulator. The reactor employed was a dry one-gallon glass autoclave equipped with a pressure gauge, thermometer, gas inlet tube, stirrer, rubber gasket for liquid injection, and an internal cooling coil attached to an external cooling source. Into this reactor were introduced 2500 ml. of dry n-hexane at 30° C., 15 mmoles of ethylaluminum sesquichloride (abbreviated as EASC) as a 25% by weight solution in hexane and 6 ml. of 5-ethylidene-2-norbornene (abbreviated as ENB). Propylene gas was fed into the reactor to an internal pressure of 30 p.s.i.g. at a temperature of 30° C. The pressure was then brought to 50 p.s.i.g. by feeding ethylene. Then 027 ml. of zinc O,O-bis(4-methyl-2-pentyl)phosphorodithioate was added; this amount represents 0.6 mmole. Next, 2.0 mmoles of vanadium oxytrichloride was added as a 10% by volume solution in hexane. An additional 2 ml. increment of ENB was added to the reactor 10 minutes after the vanadium oxytrichloride addition. The reaction was allowed to proceed for 30 minutes while maintaining the temperature at 30° C. and the pressure at 50 p.s.i.g. by feeding ethylene and propylene at a 1/1 molar ratio. After 30 minutes the polymerization was terminated by the addition of 2 ml. of polypropylene glycol (molecular weight about 2000). The terpolymer was precipitated by adding the reaction mixture to 3000 ml. of isopropanol containing 0.4% by weight of 2,2'-methylenebis(4-methyl-6-t-butylphenol) antioxidant. The polymer was dried overnight under vacuum at 40° C. The yield was 86.4 grams of polymer containing 47% propylene by weight; iodine number 13.6; intrinsic viscosity 1.39 (all intrinsic viscosities herein are expressed as deciliters per gram in Tetralin at 135° C.), branching index 0.89.

Repetition of the example without the zinc O,O-bis(4-methyl-2-pentyl)phosphorodithioate addition gave 105.5 grams of terpolymer containing 46% propylene by weight; iodine number 14.7; intrinsic viscosity 2.74, branching index 1.56. This example is summarized in Table I, along with other examples where the A columns represent the control without zinc O,O-bis(4-methyl-2-pentyl)phosphorodithioate (designated Regulator R1 is Table I) and the B columns represent the practice of the invention.

Examples 2 and 3

Examples 2 and 3 illustrate the use of zinc O,O-bis(4-methyl-2 - pentyl)phisphorodithioate (Regulator R1) in preparation of ethylene-propylene-dicyclopentadiene (abbreviated as DCPD) terpolymers and ethylene-propylene binary copolymers, respectively. The procedure was identical to that of Example 1 with the exception of the diene. The results are summarized in Table I.

Example 4

This example demonstrates the use of zinc O,O-bis(4-methyl-2-pentyl)phosphorodithioate as a regulator in which the EASC cocatalyst of Example 1 was replaced by diisobutylaluminum chloride (abbreviated DIBAC). The catalyst and cocatalyst concentrations were also slightly higher than in Example 1, and a higher concentration of regulator (1.5 mmoles) was used, but otherwise the experimental procedure in this example was the same as that of Example 1. The results are shown in Table I.

Examples 5 and 6

Examples 5 and 6 demonstrate the use of nickel (II) and chromium (III) O,O-diethyl phosphorodithioates as regulators (designated Regulator R2 and R3, respectively, in Table I) with EASC as the cocatalyst using the experimental procedure of Example 1. Both of these compounds act as regulators of the molecular weight of the terpolymer system. The results are shown in Table I.

TABLE I.—REGULATION OF EP COPOLYMERIZATION WITH PHOSPHORODITHIOATE

| | Example | | | | | | | | | |
|---|---|---|---|---|---|---|---|---|---|---|
| | 1 | | 2 | | 3 | | 4 | | | |
| | A | B | A | B | A | B | A | B | 5 | 6 |
| Cocatalyst (mmoles of aluminum): | | | | | | | | | | |
| EASC | 30 | 30 | 30 | 30 | 30 | 30 | | | 30 | 30 |
| DIBAC | | | | | | | 50 | 50 | | |
| Catalyst (mmoles): VOCl$_3$ | 2.0 | 2.0 | 2.0 | 2.0 | 2.0 | 2.0 | 5.0 | 5.0 | 2.0 | 2.0 |
| Diene | ENB | ENB | DCPD | DCPD | None | None | ENB | ENB | ENB | ENB |
| Regulator (mmoles): | | | | | | | | | | |
| R1 | | 0.6 | | 0.6 | | 0.6 | | 1.5 | | |
| R2 | | | | | | | | | 1.05 | |
| R3 | | | | | | | | | | 0.64 |
| Yield, g | 105.5 | 86.4 | 95.1 | 86.3 | 90.0 | 58.0 | 109.6 | 77.8 | 79.3 | 66.0 |
| Iodine number | 14.7 | 13.6 | 8.6 | | | | 16.3 | 18.7 | 8.3 | 16.0 |
| Propylene, wt. percent | 46 | 47 | 47 | 39 | 48 | 50 | 56 | 45 | 43 | 44 |
| I.V | 2.74 | 1.39 | 2.76 | 1.91 | 2.56 | 1.35 | 3.29 | 1.89 | 2.16 | 2.34 |
| Branching index | 1.56 | 0.89 | 3.00 | 1.92 | | | | | | |

Examples 7, 8 and 9

Examples 7, 8 and 9 are illustrations of the use of zinc N,N-dibutyl dithiocarbamate as a regulator (designated Regulator R4 in Table II) following the procedures of Examples 1, 2 and 3 respectively, except that the zinc O,O-bis(4-methyl-2-pentyl)phosphorodithioate (R1) is replaced by zinc N,N-dibutyl dithiocarbamate (R4). The data is summarized in Table II.

Examples 10–14

Examples 10–14 set forth other dithiocarbamates which function as regulators according to this invention. In these examples the procedure was substantially the same as Example 1. The results are listed in Table II, wherein Regulator R4 is zinc N,N-dibutyl dithiocarbamate, R5 is copper (II) N,N-dibutyl dithiocarbamate, R6 is iron (III) N-n-octadecyl-N-isopropyl dithiocarbamate, R7 is lead (II) N-n-octadecyl-N-isopropyl dithiocarbamate and R9 is cadmium N,N-dibutyl dithiocarbamate.

Examples 15–17

Examples 15–17 set forth other compounds which function as regulators according to the method of this invention. In these examples the procedure was substantially the same as in Example 1. The results are listed in Table III, wherein Regulator R10 is zinc O-butyl dithiocarbonate, R11 is O,O-2,2-dimethyltrimethylene hydrogen phosphorodithioate, and R12 is O,O-diethyl hydrogen phosphorodithioate.

Example 18

This example describes the in situ preparation of a zinc O,O-dialkyl phosphorodithioate and its use as a regulator. The procedure was similar to the previous example (i.e., Example 17) except that in addition to the O,O-diethyl hydrogen phosphorodithioate regulator, 0.63 gram of zinc stearate was also added to the reactor prior to the vanadium oxytrichloride injection (this is indicated as Regulator R13 in Table III). Table III lists the data from this polymerization run under the column heading 18A. The degree of regulation attained in this example, as measured by intrinsic viscosity, was substantially greater than that of the previous Example 17 but comparable to that obtained from zinc O,O-bis(4-methyl-2-pentyl)phosphorodithioate (Regulator R1) at the same level, as shown in column 18B of Table III. Zinc stearate itself (Regulator R14), even at very high levels has no effect on the intrinsic viscosity as shown by the data in column 18C of Table III.

TABLE III.—REGULATION OF EP COPOLYMERIZATION

| | Example | | | | | |
|---|---|---|---|---|---|---|
| | | | | 18 | | |
| | 15 | 16 | 17 | A | B | C |
| Diene | ENB | ENB | ENB | ENB | ENB | ENB |
| Regulator | R10 | R11 | R12 | R13 | R1 | R14 |
| Regulator (mmoles) | 2.0 | 3.0 | 2.0 | 1.0 | 1.2 | 7.1 |
| Yield, g | 114.2 | 113.8 | 82.8 | 114.0 | 82.3 | 66.8 |
| Iodine number | 10.4 | 9.9 | 12.3 | 7.5 | 16.3 | 16.5 |
| Propylene, wt. percent | 44 | 50 | 49 | 46 | 40 | 39 |
| I.V | 2.35 | 1.81 | 2.04 | 0.69 | 0.83 | 2.59 |

Example 19

This example illustrates the use of O,O-2,2-dimethyltrimethylene hydrogen phosphorodithioate as a catalyst activator. The technique of mixing the primary catalyst components (i.e. the EASC and VOCl$_3$) in the absence of the polymerizing monomers was used to accentuate the difference between the relatively poor yield obtained in the absence of the activator with that of the significantly higher yield obtained with the use of activator.

In this example the procedure was similar to that of Example 16 except for the amount of and manner of addition of the catalyst components. The EASC (15 mmoles) and VOCl$_3$ (3.0 mmoles) were mixed together in a

TABLE II.—REGULATION OF EP COPOLYMERIZATION

| | Example | | | | | | | | | | |
|---|---|---|---|---|---|---|---|---|---|---|---|
| | 7 | | 8 | | 9 | | | | | | |
| | A | B | A | B | A | B | 10 | 11 | 12 | 13 | 14 |
| Diene | ENB | ENB | DCPD | DCPD | None | None | ENB | ENB | ENB | ENB | ENB |
| Regulator | | R4 | | R4 | | R4 | R5 | R6 | R7 | R8 | R9 |
| Regulator (mmoles) | | 0.35 | | 0.35 | | 0.69 | 2.0 | 2.0 | 1.0 | 1.0 | 1.0 |
| Yield, g | 105.5 | 101.1 | 95.1 | 78.5 | 90.0 | 109.6 | 75.5 | 63.7 | 63.9 | 86.8 | 90.0 |
| Iodine number | 14.7 | 10.7 | 8.6 | 7.8 | | | 13.6 | 16.3 | 14.7 | 11.8 | 13.4 |
| Propylene, wt. percent | 46 | 43 | 47 | | 48 | 50 | | | | | |
| I.V | 2.74 | 1.79 | 2.76 | 1.26 | 2.56 | 1.38 | 1.84 | 1.74 | 2.41 | 1.74 | 1.89 |
| Branching index | 1.56 | 0.95 | 3.00 | 1.29 | | | | | | | | separate flask in the absence of the monomers and aged for 6 hours. This premix or aged catalyst solution was then added to the reactor which already contained the hexane solvent, the ethylene and propylene monomers, the ENB, and the O,O-2,2-dimethyltrimethylene hydrogen phosphorodithioate activator. The polymerization was run for 30 minutes, and worked up in the usual manner. The yield was 66.5 grams, iodine number 11.5, intrinsic viscosity 2.02, and weight percent propylene 42.

In a similar experiment without O,O-2,2-dimethyltrimethylene hydrogen phosphorodithioate, where the catalyst component was aged only 3 hours, the yield was only 35.5 grams, with an iodine number of 13.9, I.V. at 135° C. of 4.07 and propylene content 37%.

Examples 20–27

The ability of the present regulators to reduce the molecular weight permits the use of lower levels of VOCl₃ while still obtaining a polymer which is suitable for end use applications as a rubber. The use of lower catalyst levels is also inherently more efficient (efficiency being defined as the number of grams of polymer obtained per gram of VOCl₃ catalyst). The regulators employed in this invention are particularly effective in enhancing the efficiency at these lower catalyst levels. The supporting data is shown in Table IV, wherein R1 is zinc O,O-bis(4-methyl-2-pentyl)phosphorodithioate and R4 is zinc N,N-dibutyl dithiocarbamate.

The experimental procedure used in these examples was the same as in Example 1 except that the catalyst, cocatalyst, and diene (ENB) charges were varied as outlined in Table IV.

TABLE IV.—ACTIVATING EFFECT OF REGULATORS

| Example | 20 | 21 | 22 | 23 | 24 | 25 | 26 | 27 |
|---|---|---|---|---|---|---|---|---|
| EASC (mmoles) | 15 | 7.5 | 5 | 15 | 7.5 | 5 | 7.5 | 5 |
| VOCl₃ (mmoles) | 2.0 | 1.0 | .5 | 2.0 | 1.0 | .5 | 1.0 | .5 |
| ENB (mls.): | | | | | | | | |
| Initial charge | 8 | 5 | 4 | 8 | 5 | 4 | 5 | 4 |
| 10 min. charge | 3 | 2 | 1.5 | 3 | 2 | 1.5 | 2 | 1.5 |
| R1 (mmoles) | | | | 1.2 | .6 | .3 | | |
| R4 (mmoles) | | | | | | | .21 | .105 |
| Yield, g | 105.5 | 66.0 | 47.5 | 82.3 | 72.0 | 64.8 | 84.5 | 51.6 |
| Efficiency | 305 | 381 | 548 | 238 | 415 | 748 | 487 | 596 |
| I.V. | 2.74 | 3.20 | 3.54 | .83 | .91 | 1.51 | 1.51 | 2.11 |
| Iodine number (ENB) | 14.7 | 13.4 | 8.6 | 16.3 | 15.8 | 7.0 | 7.8 | 11.3 |

Examples 28, 29 and 30

Using a procedure similar to that outlined in Example 1 three ethylene-propylene-ENB terpolymers were prepared in a larger reactor such that a sufficient amount of polymer was made available for a general evaluation of vulcanizate properties. These polymers were made with zinc O,O - bis(4 - methyl - 2-pentyl) phosphorodithioate (Regulator R1 in Example 28, Table V) zinc N,N-dibutyl dithiocarbamate (Regulator R4 in Example 29, Table V) and hydrogen modified EASC/VOCl₃ catalyst system (Example 30, Table V). Since it was desired to provide these terpolymers in relatively high molecular weight form, as compared with the earlier examples, a much lower catalyst level (i.e. VOCl₃ concentration of 0.13 mmole per liter versus 1.1 mmole per liter as used in Examples 1 to 18). Examples 28, 29 and 30 also differed from the previous examples in that the polymers were isolated by steam flocculation rather than alcohol flocculation. To evaluate the polymers in a heavy service tire tread stock formulation, 100 parts by weight of polymer was mixed with 40 parts carbon black (ASTM No. N–285 type), 5 parts zinc oxide, 1 part stearic acid, 1 part N-cyclohexyl-2-benzothiazole sulfenamide, and 2 parts sulfur. The results of the evaluation are shown in Table V. Both terpolymers using the regulators of the invention (Examples 28 and 29), exhibited fast curing properties, giving a good cure in 10 minutes at 320° F.

TABLE V.—TIRE TREAD STOCKS

| | Example | | |
|---|---|---|---|
| | 28 | 29 | 30 |
| | Regulator | | |
| | R1 | R4 | Hydrogen |
| Polymer properties: | | | |
| I.V. | 3.31 | 1.98 | 1.91 |
| Propylene, wt. percent | 42 | 46 | 44 |
| Mooney viscosity, ML-4 at 212° F | 94 | 99 | 102 |
| Iodine number | 11.0 | 13.0 | 12.5 |
| Compound properties: | | | |
| Monsanto Rheometer: | | | |
| R max | 130 | 114 | 121 |
| R min | 20 | 8.5 | 8.8 |
| T₅ | 4.0 | 4.3 | 5.0 |
| T₉₀ | 28 | 31.5 | 30 |
| Cured properties: | | | |
| 10 min. at 320° F.: | | | |
| Tensile, p.s.i | 3,830 | 1,710 | 2,130 |
| 300% modulus, p.s.i | 1,090 | 990 | 840 |
| Elongation, percent | 560 | 390 | 470 |
| Hardness, Shore "A" | 65 | 63 | 64 |
| 30 min. at 320° F.: | | | |
| Tensile, p.s.i | 2,870 | 2,410 | 1,660 |
| 300% modulus, p.s.i | 2,140 | 1,830 | 1,830 |
| Elongation, percent | 320 | 340 | 250 |
| Hardness, Shore "A" | 68 | 68 | 68 |

Examples 31 to 36

Some of the regulators of this invention are especially suitable for preparing liquid copolymers having molecular weights as low as 1500 (I.V. of about 0.10). The specificity with respect to liquid copolymers depends on the particular catalyst components. Outstanding results are obtained with vanadium oxychloride and vanadium acetonylacetonate with the latter as the preferred catalyst along wkith alkyl aluminum sesquichloride and zinc phosphorodithioates as the molecular weight regulators.

This example demonstrates the synthesis of "liquid" ethylene-propylene-ENB terpolymers using zinc O,O-bis-(4-methyl-2-pentyl)phosphorodithioate as the regulator. The reactor employed was equipped with a pressure gauge, thermometer, gas inlet tube, stirrer, rubber gasket for liquid injections, and an internal cooling coil attached to an external cooling sources. Into this reactor were introduced 2500 mls. of dry n-hexane, 15 mmoles of ethylaluminum sesquichloride (abbreviated as EASC) as a 25% by weight solution in hexane, 1.35 mls. of zinc O,O-bis(4-methyl-2-pentyl)phosphorodithionate and 8 mls. of 5-ethylidene-2-norbornene (abbreviated as ENB). Propylene gas was fed into the reactor to an internal pressure of 30 p.s.i.g. at a temperature of 30° C. The pressure was then increased to 35 p.s.i.g. with hydrogen and finally brought to 50 p.s.i.g. with an ethylene. Next, 3.0 mmoles of vanadium oxytrichloride was added as a 10% by volume solution in hexane. An additional 3 mls. increment of ENB was added to the reactor 10 minutes after the vanadium oxytrichloride addition. The reaction was allowed to proceed for 30 minutes while maintaining the temperature at 30° C. and the pressure at 50 p.s.i.g. by feeding ethylene and propylene at a 1/1 molar ratio. After 30 minutes the polymerization was terminated by the polymerization was terminated by the addition of 2 mls. of polypropylene glycol (molecular weight about 2,000). 1.5 gms. of 2,2'-methylene - bis(4 - methyl-6-t-butylphenol) antioxidant was added to the polymer solution. The solution volume was then reduced to about 700 mls. total by vacuum distillation techniques. This concentrated liquid EPDM cement was then washed with 500 mls. of an aqueous polyetherdiamine solution for catalyst removal following the procedure of U.S. Pat. 3,547,855, F. C. Loveless, Dec. 15, 1970. A small amount of HCl was also added to the wash solution to assure an acidic pH. The remaining hexane solvent was then evaporated off and the polymer was dried overnight under vacuum at 60° C. The analytical data obtained on this polymer are listed in Table VI as Example 31.

Repetition of the above example without the zinc O,O-bis(4-methyl-2-pentyl)phosphorodithioate gave a much higher molecular weight polymer whose analytical and polymerization data is listed as Example 32 of Table VI.

Repetition of Example 31 without the hydrogen addition but where the initial propylene loading was 33 p.s.i.g. followed by an ethylene feed to 50 p.s.i.g. gave a similar polymer to that of Example 31 but slightly higher in molecular weight. The data for this polymer is listed as Example 33 in Table VI.

Example 34 is a repetition of Example 31 in which the zinc O,O-bis(4-methyl-2-pentyl)phosphorodithioate as well as the hydrogen were eliminated. The properties of this terpolymer are given in Table VI.

Example 35 and 36 illustrate the use of zinc O,O-bis-(4-methyl-2-pentyl)phosphorodithioate in the preparation of ethylene-propylene-dicyclopentadiene (abbreviated as DCPD) and ethylene-propylene-1,4-hexadiene copolymers (abbreviated as 1,4-H) respectively. The procedure was identical to that of Example 31 with the exception of the diene. The results are summarized in Table VI.

TABLE VI.—LIQUID TERPOLYMERS

| Example | 31 | 32 | 33 | 34 | 35 | 36 |
|---|---|---|---|---|---|---|
| Diene | ENB | ENB | ENB | ENB | DCPD | 1,4-H |
| Zinc O,O-bis(4-methyl-2-pentyl)phosphorodithioate (mmoles) | 3 | | 3 | | 3 | 3 |
| Hydrogen, p.s.i.g | 5 | 5 | | | 5 | 5 |
| Yield, g | 149 | 280 | 149 | 143 | 117 | 89 |
| Propylene, wt. percent | 46 | 33 | 53 | 49 | 41 | 46 |
| Iodine number | 8.8 | 11.0 | 10.5 | 18.5 | 7.0 | 8.0 |
| Intrinsic viscosity | .32 | 1.48 | .40 | 2.81 | .28 | .27 |
| Mooney viscosity, ML-4 at 212° F | | 43 | | >150 | | |
| Molecular weight, $M_n$ | 5,400 | | 5,320 | | 5,150 | 5,400 |
| Brookfield viscosity at 60° C., poises | 1,404 | | 5,588 | | 812 | 533 |

These examples demonstrate the use of vanadium acetonylacetonate as the preferred catalyst along with aluminum sesquichloride and zinc phosphorodithioate as the molecular weight regulator. This system is especially useful for the preparation of very low molecular weight terpolymers.

Examples 37, 38 and 39 are ethylene-propylene-ENB liquid terpolymers made using the procedure of Example 31, the only difference being the catalyst. Example 37 is the control, run without any hydrogen and zinc phosphorodithioate. Example 38 was made using zinc O,O-bis(4-methyl-2-pentyl) phosphorodithioate as the sole molecular weight regulator. Example 39 was made using the combination of zinc phosphorodithioate and hydrogen as a molecular weight regulator. Examples 40 and 41 are analogous to Examples 37 and 38 with the exception that no termonomer was used. Examples 42 and 43 are analogous to Examples 37 and 38 using dicyclopentadiene as the termonomer.

As can be noted from the data in Table VII the combination of vanadium acetonylacetonate and zinc phosphorodithioate is a much more powerful regulator of molecular weight than the combination of vanadium oxytrichloride and zinc phosphorodithioate. This is reflected by the intrinsic viscosities and molecular weights which are approximately 50 percent lower, and the Brookfield viscosities at 25° C. which are significantly lower than the 60° C. viscosities (as in Examples 31, 33, 35 and 36) of the polymers made using vanadium oxytrichloride as the catalyst.

conjugated diene, in solution in an inert organic solvent in the presence of a vanadium salt-alkylaluminum halide anionic coordination polymerization catalyst which is soluble in said solvent, the improvement comprising carrying out the said polymerization in the presence of a regulator selected from the group consisting of (a) a phosphonodithioate of the formula

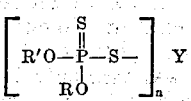

wherein R and R' are alkyl, cycloalkyl, aryl, aralkyl, or are connected together as a polymethylene chain, Y is hydrogen or a metal of Groups I-B-VIII-B, III-A or IV-A, and $n$ is a number equal to the valence of Y, (b) a dithiocarbamate of the formula

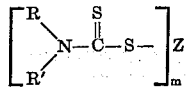

wherein R and R' are as previously defined, Z is a metal as previously defined for Y, and $m$ is a number equal to the valence of said metal, and (c) a dithiocarbonate of the formula

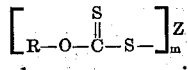

where R, Z and $m$ are as previously defined, whereby the molecular weight of the resulting copolymer is regulated.

2. A method as in claim 1 in which the said copolymer is a saturated ethylene-propylene binary copolymer.

3. A method as in claim 1 in which the said copolymer is an unsaturated ethylene-propylene-non-conjugated diene terpolymer.

4. A method as in claim 3 in which the said diene is 5-ethylidene-2-norborene.

5. A method as in claim 3 in which the said diene is dicyclopentadiene.

6. A method as in claim 3 in which the said diene is 1,4-hexadiene.

7. A method as in claim 1 in which the said vanadium salt is vanadium oxytrichloride.

8. A method as in claim 1 in which the said vanadium salt is vanadium acetylacetonate.

TABLE VII.—LIQUID TERPOLYMERS

| Example | 37 | 38 | 39 | 40 | 41 | 42 | 43 |
|---|---|---|---|---|---|---|---|
| Diene | ENB | ENB | ENB | | | DCPD | DCPD |
| Zinc O,O-bis(4-methyl-2-pentyl) phosphorodithioate (mmoles) | | 3.0 | 3.0 | 3.0 | 3.0 | 3.0 | 3.0 |
| Hydrogen, p.s.i.g | | | 5.0 | | 5.0 | | 5.0 |
| Yield, g | 70 | 80 | 70 | 90 | 84 | 78 | 66 |
| Propylene, wt. percent | 31 | 39 | 33 | 41 | 33 | 26 | 28 |
| Iodine number | 25 | 12 | 27 | | | 13 | 16 |
| I.V | 1.83 | 0.19 | 0.13 | 0.14 | 0.13 | 0.14 | 0.13 |
| Molecular weight, $M_n$ | | 2,440 | | 2,770 | 2,000 | 2,630 | |
| Brookfield viscosity at 25° C., poises | | 760 | 1,875 | 490 | 225 | | |

We claim:

1. In a method of copolymerizing ethylene and an alpha-monoolefin, with or without a copolymerizable non- 9. A method as in claim 1 in which the said alkylaluminum halide is ethylaluminum sesquichloride.

10. A method as in claim 1 in which the said alkyl-aluminum halide is diisobutylaluminum chloride.
11. A method as in claim 1 in which the said regulator is a zinc compound.
12. A method as in claim 1 in which the said regular is a nickel compound.
13. A method as in claim 1 in which the said regulator is a chromium compound.
14. A method as in claim 1 in which the said regulator is a copper compound.
15. A method as in claim 1 in which the said regulator is an iron compound.
16. A method as in claim 1 in which the said regulator is a lead compound.
17. A method as in claim 1 in which the said regulator is a cadmium compound.
18. A method as in claim 1 in which the said regulator is a phosphorodithioate of formula (a).
19. A method as in claim 18 in which Y is hydrogen.
20. A method as in claim 18 in which Y is zinc.
21. A method as in claim 18 in which the said phosphorodithioate is zinc O,O-bis(4 - methyl-2-pentyl) phosphorodithioate.
22. A method as in claim 18 in which the said phosphorodithioate is nickel (II) O,O-diethylphosphorodithioate.
23. A method as in claim 18 in which the said phosphorodithioate is chromium (III) O,O-diethyl-phosphorodithioate.
24. A method as in claim 19 in which the said phosphorodithioate is O,O-2,2 - dimethyltrimethylene hydrogen phosphorodithioate.
25. A method as in claim 18 in which the said phosphorodithioate is O,O-diethyl hydrogen phosphorodithioate.
26. A method as in claim 18 in which the said phosphorodithioate is zinc O,O-diethyl phosphorodithioate.
27. A method as in claim 1 in which the said regulator is a dithiocarbamate of formula (b).
28. A method as in claim 27 in which the said dithiocarbamate is zinc N,N-dibutyl dithiocarbamate.
29. A method as in claim 27 in which the said dithiocarbamate is copper (II) N,N-dibutyl dithiocarbamate.
30. A method as in claim 27 in which the said dithiocarbamate is iron (III) N-n-octadecyl-N-isopropyl dithiocarbamate.
31. A method as in claim 27 in which the said dithiocarbamate is lead (II) N-n-octadecyl-N-isopropyl dithiocarbamate.
32. A method as in claim 27 in which the said dithiocarbamate is chromium (II) N-n-octadecyl-N-isopropyl dithiocarbamate.
33. A method as in claim 27 in which the said dithiocarbamate is cadmium N,N-dibutyl dithiocarbamate.
34. A method as in claim 1 in which the said regulator is a dithiocarbonate of formula (c).
35. A method as in claim 34 in which the said dithiocarbonate is zinc O-butyl dithiocarbonate.
36. A method of copolymerizing ethylene and propylene, with or without a copolymerizable non-conjugated diene, to form a copolymer of the said monomers which is liquid at ambient temperature, comprising contacting the said monomers in an inert organic solvent with vanadium oxytrichloride or vanadium acetylacetonate as a catalyst and an alkyl aluminum sesquichloride as a cocatalyst, in the presence of a polymerization regulator which is a zinc phosphorodithioate of the formula

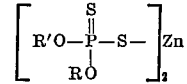

wherein R and R' are alkyl groups.
37. A method as in claim 36 in which a copolymerizable non-conjugated diene is present.
38. A method as in claim 36 in which the said catalyst is vanadium acetylacetonate.
39. A method as in claim 36 in which hydrogen regulator is also present.
40. A method as in claim 36 in which the said diene is dicyclopentadiene.
41. A method as in claim 36 in which the said diene is 5-ethylidene-2-norbornene.
42. A method as in claim 36 in which the said diene is 1,4-hexadiene.

References Cited
UNITED STATES PATENTS

| | | | |
|---|---|---|---|
| 3,674,824 | 7/1972 | Amidon et al. | 260—429 K |
| 3,544,533 | 12/1970 | Dreyfuss | 260—80.78 |
| 3,462,399 | 8/1969 | Matthews | 260—80.78 |
| 3,377,325 | 4/1968 | Loveless | 260—80.78 |
| 3,325,461 | 6/1967 | Boor | 260—93.7 |
| 3,051,690 | 8/1962 | Van den Berg | 260—88.2 |

FOREIGN PATENTS

| | | |
|---|---|---|
| 6803332 | 9/1968 | Netherlands. |
| 902,845 | 6/1960 | Great Britain. |
| 889,852 | 7/1960 | Great Britain. |
| 875,601 | 8/1961 | Great Britain |
| 838,325 | 6/1960 | Great Britain. |

OTHER REFERENCES

B.C. Repka in Kirk-Othmer's Encyclopedia of Chemical Technology (2nd edition, 1967), vol. 14, p. 295.

JOSEPH L. SCHOFER, Primary Examiner
A. L. CLINGMAN, Assistant Examiner

U.S. Cl. X.R.
260—80.78, 88.2 R, 94.4, 94.9 CB, 94.9 CC, 94.9 E